United States Patent [19]

Marquette

[11] 3,772,572

[45] Nov. 13, 1973

[54] PLUG-IN EQUIPMENT STORAGE UNIT

[76] Inventor: John Lester Marquette, 126 E. Green St., Westminster, Md.

[22] Filed: May 31, 1972

[21] Appl. No.: 258,407

[52] U.S. Cl. .............................. 317/101 DH, 211/41

[51] Int. Cl. ............................................... H02b 1/02

[58] Field of Search............... 317/101 DH, 101 CB; 312/263, 257 R; 211/41

[56] References Cited

UNITED STATES PATENTS

| | | | |
|---|---|---|---|
| 2,959,715 | 11/1960 | Leonchick | 312/257 R |
| 3,098,177 | 7/1963 | Bleir et al. | 317/101 DH |
| 3,360,689 | 12/1967 | Haury | 317/101 DH |

FOREIGN PATENTS OR APPLICATIONS

| | | | |
|---|---|---|---|
| 684,282 | 4/1964 | Canada | 200/41 |
| 815,912 | 7/1959 | Great Britain | 317/101 DH |
| 1,100,671 | 1/1968 | Great Britain | 317/101 DH |
| 1,147,280 | 4/1963 | Germany | 317/101 DH |

OTHER PUBLICATIONS

"Standardized Components Speed Packaging of Circuit Boards," Elec. Design. News, April 1968, p. 959

*Primary Examiner*—David Smith, Jr.
*Attorney*—John F. McClellan, Sr.

[57] ABSTRACT

A low cost protective and visual storage of plug-in equipment in a basic metal frame made of a plurality of angle pieces having perpendicular flanges, said frame equipped with a plurality of side-by-side tracks and guides and which are easily variable in position or proportion and replaceable to facilitate the storing of a variety of plug-in equip-ment, safely and securely, in the normal operating position of the plug-in equipment.

5 Claims, 5 Drawing Figures

PLUG-IN EQUIPMENT STORAGE UNIT

This invention relates generally to storage devices and specifically to rack-type cabinets for storing plug-in electrical equipment boards and the like.

To better understand this invention a clear definition of the term plug-in equipment is essential. As defined in the daily pursuit of communication services and similar industries, plug-in equipment means those electronic or electrical networks, units or similar devices that are portable (not hard wired) which are plugged into an electrically connected (hard wired) receptacle as these types of apparatus are required in the make-up of a single circuit, a carrier system such as the Bell System's N and T type systems, or any combination of electrical paths used in the communications field and similar industries. This plug-in equipment is generally manufactured on a printed circuit board with a typical array of transistors, diodes, resistors, etc. that are not protected from damage on the sides by a shield or similar device. Also, when the plug-in equipment is plugged into a receptacle, the electrical connection previously mentioned, is accomplished by a set of pins usually protruding from the rear of the plug-in unit. These pins are small and often numerous and if they are broken, bent or damaged in some way, frequently they cannot be repaired and the plug-in equipment is junked.

Due to the above absence of protective shielding and the delicate construction, i.e., printed circuit boards, pins, electrical components, etc., the Plug-in Equipment Storage Unit was designed to completely protect this plug-in equipment while it is stored in offices and storerooms until required for establishing service or in the case of maintenance spare plug-in equipment, required for restoring service.

A unique characteristic of this invention is that the basic frame design is not changed, only the dimensions, to solve the storage problems presented by the multitude of the different shapes and sizes of plug-in equipment normally used in the many types of communication and electronic systems.

Another characteristic of this invention is that each storage unit is complete for the protective storing of a particular plug-in unit and requires no additional attachments for it's use. An enclosed base and a top are incorporated in the design of this invention to make the storage unit attractive, to raise the storage unit above the normal house service activity of floor cleaning and to provide an easily cleaned, usable work surface on top. While the base and top are desirable for these reasons, both are optional and are not required in the use of any Plug-in Equipment Storage Unit.

Another object of this invention is to provide, within a welded steel frame, tracks to carefully guide the plug-in unit into place and to securely hold this plug-in unit in its normal operating position and thus protect all component parts such as the printed circuit boards, pins, electrical components, etc. In addition, the plug-in equipment that is equipped with "locking levers", are so positioned on the track as to permit the locking levers to engage a bar and "lock" in the same fashion as found in their normal function. A salient feature of the aluminum track and guide system is that if any become damaged, duplicates could be obtained and the damaged section repaired.

It is a further object of this invention to provide the purchaser-user with a low cost solution to his plug-in equipment storage problems. Since each Plug-in Equipment Storage unit is complete and self-supporting, whether placed on the floor or relay rack mounted, the initial purchase of the storage units can be limited to just the particular type and quantity needed at a specific location to meet current needs. As growth or expansion occurs, additional units may be obtained and bolted to the existing storage units to form a vertical stack or bay. This bolting is accomplished through the use of standard, pre-drilled holes in the basic steel frame so that any type or types of storage units can be securely bolted together for any desirable height. A uniform, flat rear surface is created by using these standard holes, thus permitting the user to safely fasten the storage unit bay to a wall or use several bays of storage units back to back.

Another low cost characteristic of this invention is that only one base and one top are used when desired, but they are not required, in bolting together a number of the same type or different types of Plug-in Equipment Storage Units to form a vertical stack or bay. While the base is bolted to the lower storage unit by using the same standarized, pre-drilled type holes, the top is of a snap-on variety and is simply removed when adding the new storage units and then the top is snapped-on to the uppermost storage unit.

Horizontal expansion to the left or right side of any Plug-in Equipment Storage Unit is possible due to the basic frame construction which presents a flat exterior surface at each side of the storage unit for the purpose of bolting storage units together horizontally. However there are no standard, predrilled holes in these flat exterior side surfaces because of the many different heights of storage units required to store the various sizes of plug-in equipments. By way of explanation in the lack of pre-drilled holes, a standard height could have been selected and holes drilled in the manner similar to that for the 23 inch length of the storage units for the building of vertical stacks or bays. This action would have been expensive because if the standard height selected would be 10 inches, a 4 inch high plug-in unit would result in a 6 inch waste of materials and a similar unusable 6 inch storage space in the purchaser-users office or storeroom. Multiple shelf storage units, i.e., two shelves of 4 inch plug-in units in a 10 inch storage unit, would not permit the purchaser-user to obtain only the quantity of storage units he needs for current demands. This fact is important because even in a small office, there are as many as 10, 12 or more different types, shapes and sizes of plug-in equipment.

A further characteristic of this invention are the moveable dust shields that are provided to cover the lower bolting areas at the left and right sides of the lower track systems. These dust shields present an attractive appearance, are easily cleaned and eliminate an unsightly dirt and dust collecting area. The moveable dust shields are so constructed that they can be used indefinitely for covering or exposing the bolting area.

A further object of this invention is to provide the user with a rapid means for identifying the plug-in equipment normally stored in a particular Plug-in Equipment Storage Unit. This identification is necessary because there are generally many different plug-in units comprising a certain type of plug-in equipment. As in the case of the maintenance spares previously mentioned, some plug-in units are more important than others because they may affect many services while the others may affect only one service. This is one reason why a designation strip is provided on the front of each storage unit so each piece of plug-in equipment can be labeled and readily identified so local procedures can be started to replace any missing plug-in units.

Additional objects of this invention will become apparent from the following detailed discussion associated with the attached drawings wherein.

The materials used in the Plug-in Equipment Storage Units as presently designed for a 23 inch shelf of plug-in equipment and referred to in the detailed description are:

1. Basic frames of storage units and bases— 1 inch by 1 inch by one-eighth inch angle hot rolled steel AISI M–1020 that has a tensile strength of 60,000 to 80,000 lbs. per square inch,
2. Plug-in equipment tracks, top, designation strip, and cap— 5052 H32 aluminum alloy,
3. Dust Shields — 0.010 stainless steel, type 304,
4. Base covering— 20 gauge cold rolled steel, SA-E1010.

These materials have proven best to provide a low cost and attractive Plug-in Equipment Storage Unit to meet the anticipated demands for the standard 23 inch storage unit. However, it is not intended to restrict this invention to these materials alone because of customer requests or a change in the art of material manufacturing that would provide other suitable materials. For example, a purchaser-user may request a complete stainless steel storage unit which would be made the same as a production model storage unit except for the substitution of material. Other requests for the Plug-in Equipment Storage Unit to be used as maintenance table supports, maintenance area dividers, pallet shipping units, etc. require specific materials to meet these demands but the basic frame structure, tracks and guides, etc. are not altered.

Figures 1, 2, 3:
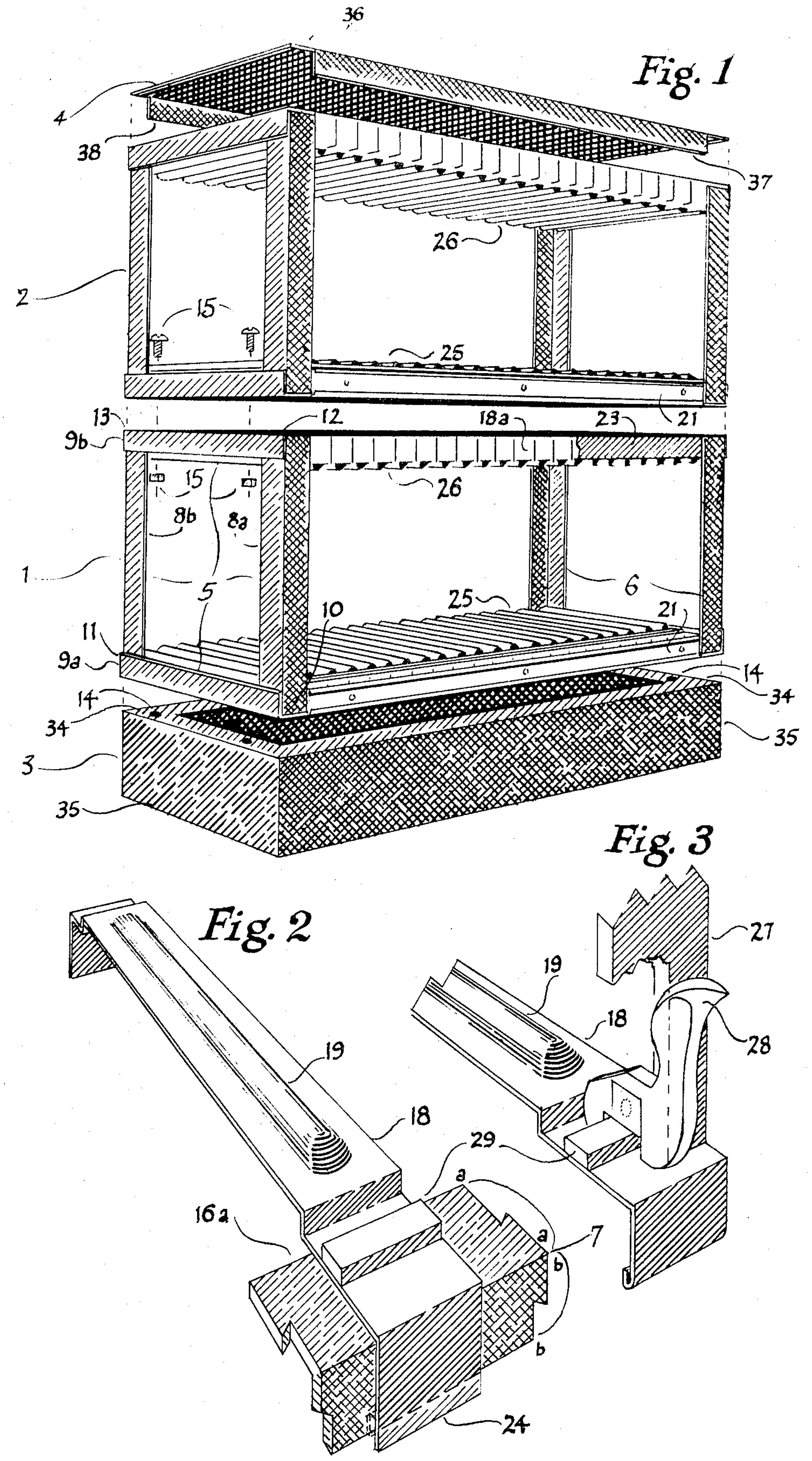
FIG. 1 is an exploded, perspective view of the front and left side of two plug-in Equipment Storage Units and their associated base and top.
FIG. 2 is a perspective view of a lower track and guide section showing the locking bar and method for mounting the track on a horizontal support bar.
FIG. 3 is a cutaway view of a lower track and guide section showing the normal operation of the locking lever which is inherent in those plug-in units so equipped.

Referring to FIG. 1, this drawing shows the front and left perspective view of two complete Plug-in Equipment Storage Units 1 and 2, the enclosed base 3, and a top 4 which incorporate a preferred form of this invention. A vertical stack or bay of the two storage units is shown to better illustrate the low cost versatility of this invention.

In the drawing of FIG. 1 and by using the illustration of storage unit 1, the construction of the left 5 and right 6 sides of the basic frame can be readily described. A detailed description of the left 5 side will suffice for the right 6 side since they are identically made and simply turned around or turned over for the opposite sides use. The positioning of the angle steel pieces to form these basic frame sides is most important so as to obtain a flat exterior surface. This flat exterior surface is required when a storage unit is to be placed on a base or the floor, when a number of storage units are bolted together for back to back, vertical or horizontal expansion for stacks and bays, when a storage unit is placed next to a cabinet or frame and when storage unit stacks or bays are safely secured to a wall or similar solid surface.

The terms to be applied to the angles and flanges of the angle steel used in the basic frame construction can best be defined pictorially by referring to the drawing in FIG. 2. The outside angle 7 separates the outside faces of the second and first flanges shown by the lines *a—a* and *b—b* respectively while the opposites become the inside faces of the angle and inside faces of the flanges.

Referring to storage unit 1 in FIG. 1, the vertical side pieces **8*a* and 8*b* control the height of a storage unit required for a particular type of plug-in equipment. The horizontal side pieces 9*a* and 9*b* control the depth of the storage unit as required by the plug-in equipment to be stored and the depth includes the protective space for the "pins" that enable the electrical connection to be made as previously discussed. This simple variation of these side pieces 8*a*, 8*b*, 9*a*, and 9*b*** then denote the different size storage units for the variety of shapes and sizes of plug-in equipment.

The front vertical side piece **8*a* is positioned so that one outside flange-face, that of the second flange is part of the front exterior of the storage unit the other outside flange-face is part of the left side exterior and the outside angle becomes the left, front edge of the storage unit. The left outside flange-face of piece 8*a* is then welded to the inside flange-face of piece 9*a* at the front end corner 10 which places the outside faces of the flanges of 9*a* at the left side and bottom exterior of the storage unit and the outside angle becomes the left, bottom edge of the storage unit. Piece 8*b* is then vertically positioned at the opposite end of 9*a* so that one outside flange-face is part of the left side exterior and is welded to the inside flange-face of 9*a* at corner 11 and the second outside flange-face of 8*b* becomes part of the rear exterior while the outside angle becomes the left vertical rear edge of the storage unit. One outside flange-face, that of the first flange of piece 9*b* becomes part of the left exterior side and is welded to the upper ends and inside faces of the flanges of vertical pieces 8*a* at corner 12 and 8*b* at corner 13 while the second outside flange-face of piece 9*b* becomes part of the top exterior of the storage unit and the outside angle becomes that left top edge of the storage unit. Again, the left 5 and right 6** sides are identical and manufactured alike with one turned around or turned over to form the opposite side.

These procedures then places the required flat surfaces on the exterior of the Plug-in Equipment Storage Units for back to back use, vertical and horizontal expansion, safe securing to walls, etc.

To assure these flat exterior surfaces, standard holes 14 are pre-drilled in all storage units and bases and are designed to be used when bolting 15 a number of storage units together to form a vertical bay like the one illustrated in FIG. 1. These standard pre-drilled holes 14 are centered on the 1 inch exterior bottom and top, outside faces of the flanges of the angle steel with a standard distance for the holes of 2 inches and 8 inches as measured from the rear edges of the basic frame for each storage unit and base. These standard holes 14 mean that regardless of the depth, i.e., 10 inches, 12 inches, etc. of the Plug-in Equipment Storage Units, a continuous left side, right side and rear flat exterior surface will constantly be developed as storage units are bolted 15 together.

Another important characteristic of the basic frame in accordance with the present invention is the positioning of the four horizontal support bars. As previously discussed, many of the plug-in equipment units are delicately constructed and some, due to their printed circuit boards, cannot support any additional weight without causing some damage to the circuit boards and frequently, damage beyond repair. The proper positioning of these horizontal support bars provides a ⅛ inch clearance at the top and bottom for plug-in equipment stored in a Plug-in Equipment Storage Unit. A ¼ inch clearance is provided between two storage units or a single storage unit and a base as shown in FIG. 1. The clearances between the horizontal support bars and any other object assure the user that no external weight will be applied to any plug-in equipment stored in a Plug-in Equipment Storage Unit.

Figure 4:
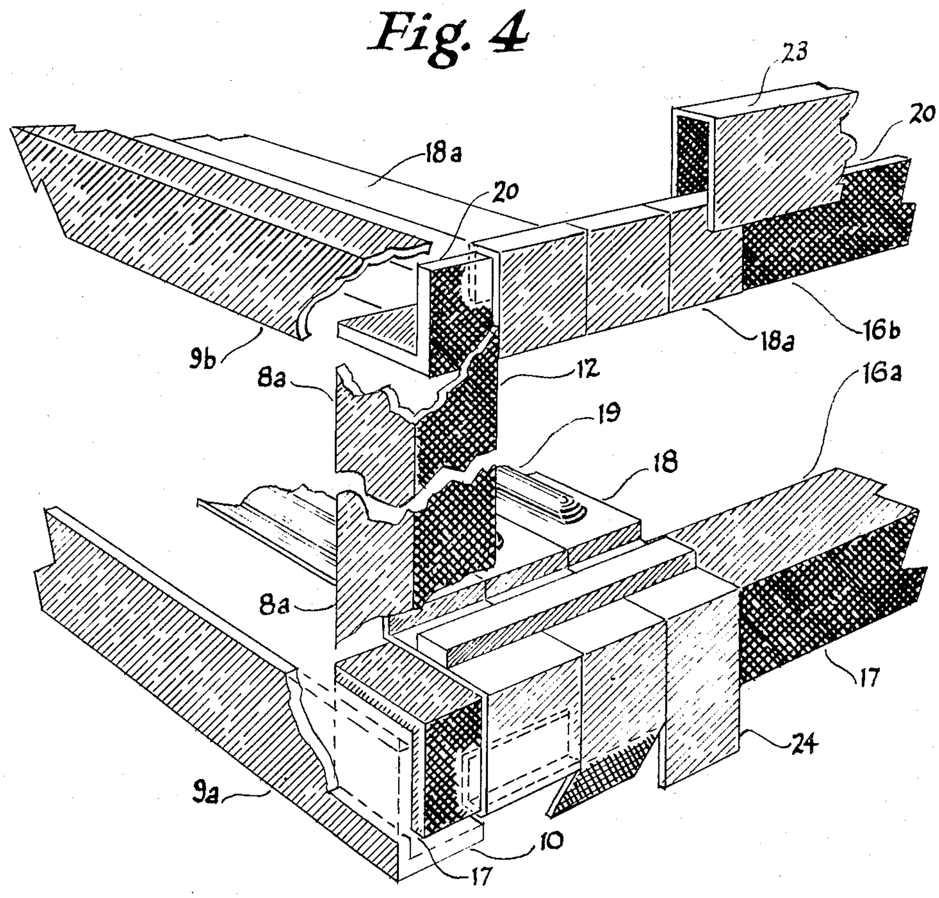
FIG. 4 is a cutaway view of the lower and upper left front corners of the Plug-in Equipment Storage Units showing the positioning of the horizontal support bars and the method of mounting the track and guide system.

The positioning of these horizontal support bars is best illustrated by the drawing in FIG. 4 which shows the lower **16*a* and upper 16*b* horizontal support bars located at the front of a Plug-in Equipment Storage Unit. The remaining two lower and upper horizontal support bars at the rear of each storage unit are not shown because their mounting and operation are the same as for the horizontal bars 16*a* and 16*b*** and one detailed description will, therefore, suffice for both. Also, since both ends of a horizontal support bar must be positioned in the same manner, only the left front vertical section of the basic frame will be discussed in detail which will, therefore, suffice for both ends.

Referring to the cutaway drawing of FIG. 4, the lower front horizontal support bar **16*a* has one of the outside faces of the flanges welded to the lower front inside flange-face of the left side vertical support 8*a* at corner 10. The left end of the lower horizontal support bar 16*a* is welded to the second inside flange-face of the left side vertical support 8*a* at corner 10. The lower ⅛ inch edge 17 of the horizontal support bar 16*a* is placed on and welded to the bottom inside flange-face of the left horizontal side piece 9*a* at corner 10. Because this bottom flange is ⅛ inch thick, this placement provides a minimum clearance of one-eighth inch between the lower edge 17 of the horizontal support bar 16*a*** and any other object that the Plug-in Equipment Storage Unit may be placed upon.

The second outside flange-face of the lower front, horizontal support bar **16*a* is then facing towards the upper horizontal support bar 16*b*. The top facing of one outside flange-face of the lower front horizontal support bar 16*a* and a similar top facing outside flange-face of the lower rear horizontal support bar serve as a base to support the lower track 18 and guide 19** assembly to be described later.

The upper front horizontal support bar **16*b* has one of the outside faces of the flanges welded to the upper front inside flange of the left side vertical support 8*a* at corner 12. The left end of the upper horizontal support bar 16*b* is welded to the second inside flange-face of the left side vertical support 8*a* at corner 12. The upper ⅛ inch edge 20 of the horizontal support bar 16*b* is placed on and welded to the inside flange-face of the upper left horizontal side piece 9*b* at corner 12. Because this flange is ⅛ inch thick, this placement provides a minimum clearance of one-eighth inch between the upper edge 20 of the horizontal support bar 16*b*** and any other object that may be placed across the top of a Plug-in Equipment Storage Unit.

The second outside flange-face of the upper horizontal support bar **16*b* is facing towards the lower horizontal support bar 16*a*. The bottom facing outside flange-face of the upper front horizontal support bar 16*b* and a similar bottom facing outside flange-face of the upper rear horizontal support bar serve as a base to support the upper track 18*a*** and guide assembly to be described later.

The clearance formed by the proper positioning of the lower **16*a* and upper 16*b* horizontal support bars, while desirable to protect the stored plug-in equipment, would present an unsightly appearance to the finished storage units. To improve the appearance of the Plug-in Equipment Storage Unit, the designation strips 21 (FIG. 1) are placed to the lower front of the storage units 1 and 2, cover the track assemblies and are secured through holes in the front, lower horizontal support bar by using rivets as shown and positioned to cover about 75 percent of the ⅛ inch clearance opening created by the lower horizontal support bar 16*a* placement. A U-section cap strip 23 (FIG. 1 and FIG. 4) was then designed to be placed over the upper track 18*a* assembly to cover about 75 percent of the ⅛ inch clearance opening created by the upper horizontal support bar 16*b* placement. The designation strip 21 and cap 23** have a final clearance of approximately one-sixteenth inch which does not destroy the protection against any additional weight for the plug-in equipment and is not unsightly when viewed in the finished article.

The designation strip 21 also provides a means for labeling all stored plug-in units so that any missing units may be readily identified for replacement purposes.

The drawing in FIG. 2 shows one section of the lower aluminum track 18 and guide 19 system which is shown mounted on the lower front horizontal support bar **16*a*. The tab 24 of the elongate strip track 18 section can best be seen in FIG. 4 where it is bent over the lower edge 17 and up to the inside flange-face of the support bar 16*a* which then securely holds the track 18 and guide 19 system in place. Only this one front track 18 and guide 19 section mounting is illustrated in FIG. 2 since each end of the section is mounted the same way as is the upper track and guide system which is generally similar in shape (except for the locking bar to be discussed later), and made and fitted or mounted in the same manner. While many of the tracks 18 are similar for different plug-in units, there is a variety due to the length, height or width of the guide 19. Due to this variety, some of the tracks 18 and guides 19 are made individually for a single plug-in unit while less complex tracks 18 and guides 19 may be formed in larger groups of 2,3, or more. Regardless of the quantity made at one time, all tracks 18 and guides 19** are uniformly die stamped and shaped to accurately hold and guide into place the plug-in unit to be stored safely and securely in its normal operating position thus protecting all component parts.

The lower 25 and upper 26 track and guide systems shown in FIG. 1 on storage units 1 and 2 are aligned to permit the easy insertion of any appropriate plug-in equipment. These track and guide systems 25 and 26 completely cover their respective horizontal support bars between the left 5 and right 6 vertical side pieces. This procedure prevents the track and guide system alignment from being affected due to any horizontal slippage.

The illustration of FIG. 3 concerns the fact that some plug-in equipment 27 are equipped with locking levers 28 which function to securely lock this type units in its normal operating position. The track 18 for these types of plug-in equipment 27 are designed and made with a raised section, or bar 29 (FIG. 2 and FIG. 3) to permit the locking lever 28 to duplicate its normal function. Regardless of the complexity of a track 18 and guide 19 system, should any become damaged, a duplicate can be obtained and the damaged part replaced.

Figure 5:
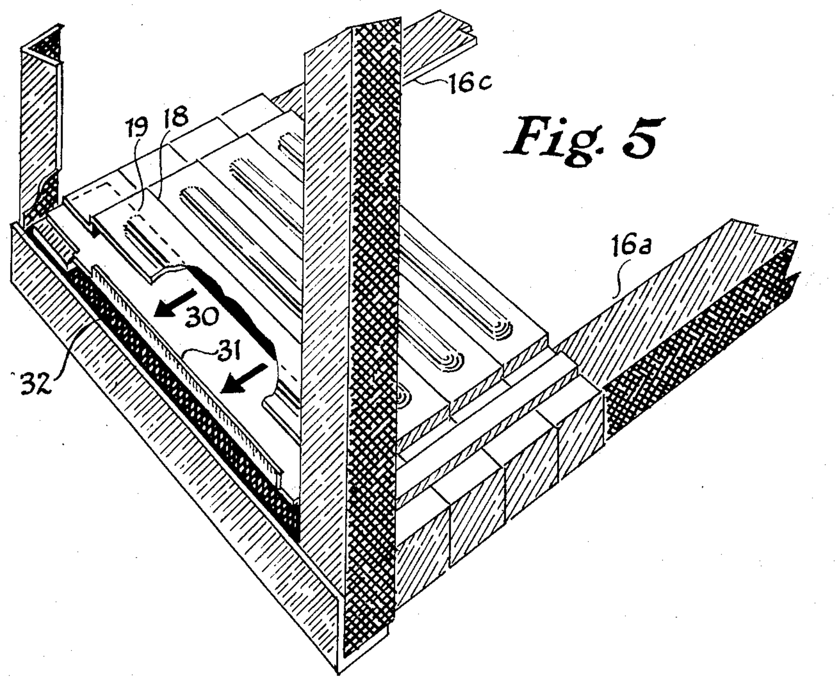
FIG. 5 is a perspective view of the dust shields.

In FIG. 5, the drawing shows a moveable plate or dust shield 30 with a raised edge 31 which provides a gripping surface. When the Plug-in Equipment Storage Units are made, these raised edges 31 are resting against the lower track system 18 with the remainder of the dust shield 30 between the lower front **16*a* and rear 16*b* horizontal bars and the track 18 and guide 19 system thus exposing the lower left side bolting area 32. A similar dust shield is provided for the lower right hand side bolting area and functions the same way. Once the storage units are in place, singly or bolted together, the raised edge provides a means for pulling the dust shields 30 away from the track 18 and guide 19 system and thus covers the bolting area 32 making an attractive, easily cleaned surface. Should the user desire to remove the bolts 15 or otherwise use the bolting area 32, the raised edges are used to simply push the dust shields 30** back to their original position.

The basic frame 34 of the base 3 in FIG. 1 (of which only the top is shown) is designed and made similar to that described for the Plug-in Equipment Storage Units basic frame except for the standard base 3 height of 4 inches and the horizontal bars are positioned so that both outside flanges become part of the exterior surface of the base frame. The base 3 is equipped with the standard, predrilled holes 14 to be used for bolting 15 to a storage unit. The base 3 also has a covering 35 spot welded to the basic frame of 20 gauge steel to make it attractive and to aid in the performance of the normal house service cleaning activities by preventing the collection of dirt and dust. Only one base is used when desired, in building a vertical stack or bay of Plug-in Equipment Storage Units.

A top 4 in FIG. 1 is notched as at 36 at all for four corners to fit between the front and rear vertical side pieces and bent at the front 37 and rear 38 to form an attractive snap-on covering. The top 4 is then snapped on or off as required when adding or removing other Plug-in Equipment Storage Units. The top 4 is not only attractive and easily cleaned but also acts as a shield to prevent damage to the upper 26 track and guide system. Only one top is used when desired in building a vertical stack or bay of Plug-in Equipment Storage Units.

Those skilled in the art will recognize that only a few embodiments of the present invention have been shown and described in detail by way of illustration and that modifications may be made to the structures shown without departing from the spirit of the invention.

I claim:

1. A storage assembly comprising a plurality of angle pieces, each angle piece having perpendicular first and second flanges, with each flange having an inside and an outside surface forming: a rectangular-shape left side assembly, a rectangular-shape right side assembly; each said side assembly comprising an upper and a lower horizontal piece with a front and a rear vertical support joining the ends of said horizontal pieces, thereby establishing the storage depth and height of said assembly, the respective first flanges of the upper and lower horizontal pieces extending in a vertical plane toward each other, the respective second flanges of the upper and lower horizontal pieces turned inward, thereby making the outside surfaces of said first flanges the exterior surfaces of the respective side assemblies, said vertical supports arranged to extend between the inside surfaces of the respective second flanges of said upper and lower horizontal pieces, each horizontal piece having at least one hole for attachment therethrough, an upper horizontal support bar joining each upper corner of the left side assembly with a corresponding upper corner of the right side assembly, a lower horizontal support bar joining each lower corner of the left side assembly with a corresponding lower corner of the right side assembly; adjacent each end of each horizontal support bar the outside surface of the first flange thereof in contact with the inside surface of the first flange of a respective vertical support, the end of each horizontal support bar in contact with the inside surface of the second flange of said respective vertical support, with the edge of the first flange of each horizontal support bar in contact with the second flange of a respective said horizontal piece, thereby establishing a clearance along a portion of each said horizontal support bar first flange in relation to the extension in a vertical plane of the respective second flanges of the horizontal pieces.

2. A storage assembly as recited in claim 1, and additionally a track and guide system comprising a first plurality of elongate strip track sections disposed transversely between the lower horizontal support bars, a second plurality of elongate strip track sections disposed transversely between the upper horizontal support bars, each end of a said elongate strip track section passing across the outer surface of the second flange of a horizontal support bar and thence turning and passing across the outer surface of the first flange thereof, the terminal portion of each end of a said elongate strip track section returning to engage the edge of said respective first flange, said first plurality and second plurality of elongate strip track sections having guides formed in the individual elongate strip track sections thereof; and each said plurality of elongate strip track sections completely covering, from vertical support to vertical support, the length of the horizontal support bars across which they pass, thereby insuring alignment of said track and guide system.

3. A storage assembly as recited in claim 2, and additionally an elongate strip designation means, means for securing the elongate strip designation means across the ends of said elongate strip track sections passing over the outer surface of the first flange of one of said lower horizontal support bars with the lower edge of the elongate strip designation means lower than the edge of the first flange of said one lower horizontal support bar but higher than portions of the second flanges of the respective lower horizontal pieces adjacent the ends thereof, and a U-section cap strip on the first flange of one of said upper horizontal support bars, thereby covering a portion of the ends of said elongate strip track sections passing across the outer surface of the first flange thereof.

4. A storage assembly as recited in claim 2, and additionally, movable dust shield means comprising: a plate disposed across said lower horizontal supports at each end thereof between the respective front vertical support and the rear vertical support, said plate having a raised edge for positioning against the first flange of the lower horizontal piece with the portion of the plate opposite the raised edge in contact with one of said elongate strip track sections.

5. A storage assembly as recited in claim 2, and additionally, each of said elongate strip track sections having a raised portion across one of said ends passing across the outer surface of the second flange of a said horizontal support bar, thereby forming a locking bar.

* * * * *